US005748013A

United States Patent [19]

[11] Patent Number: 5,748,013

[45] Date of Patent: May 5, 1998

Beauclair et al.

[54] COMBINED MAGNETIC CORE

[75] Inventors: François Beauclair, Chaville; Jean-Pierre Delvinquier, Les Ulis; Richard Lebourgeois, Villebon sur Yvette; Michel Pate, Nozay; Claude Rohart, Palaiseau, all of France

[73] Assignee: Thomson-CSF, Paris, France

[21] Appl. No.: 735,595

[22] Filed: Oct. 23, 1996

[30] Foreign Application Priority Data

Oct. 24, 1995 [FR] France .................................. 95 12493

[51] Int. Cl.$^6$ ............................ H01F 27/08; H01F 17/06; H01F 27/24; C04B 35/04

[52] U.S. Cl. ......................... 336/233; 336/212; 336/178; 336/62; 252/62.54; 252/62.56

[58] Field of Search .................................... 336/165, 178, 336/212, 233, 62; 252/62.62, 62.54, 62.56

[56] References Cited

U.S. PATENT DOCUMENTS

| | | | |
|---|---|---|---|
| 1,606,777 | 11/1926 | Payne | 336/233 |
| 2,886,529 | 5/1959 | Guillaud | 252/62.62 |
| 3,189,550 | 6/1965 | Malinofsky | 252/62.62 |
| 4,199,744 | 4/1980 | Aldridge et al. | 336/178 |
| 4,731,191 | 3/1988 | Swihart | 252/62.54 |
| 5,025,241 | 6/1991 | Bouillot et al. | 336/178 |

FOREIGN PATENT DOCUMENTS

| | | | |
|---|---|---|---|
| 0 004 272 | 10/1979 | European Pat. Off. . | |
| 0 532 788 | 3/1993 | European Pat. Off. | 252/62.58 |
| 11 59 088 | 12/1963 | Germany . | |
| 30 40 368 | 5/1982 | Germany | 336/100 |
| 34 12 003 | 10/1985 | Germany | 336/100 |
| 86 09 584 | 9/1987 | Germany | 336/165 |
| 55-65415 | 5/1980 | Japan | 336/62 |
| 60-15908 | 1/1985 | Japan | 336/212 |
| 62-228605 | 9/1988 | Japan | 336/212 |

OTHER PUBLICATIONS

Patent Abstract of Japan, vol. 9, No. 75 (E-306) Apr. 4, 1985, JP-A-59 210623 (Matsushita Denko K.K.), Nov. 29, 1984, abridged.

Patent Abstract of Japan, vol. 10, No. 347 (E-457), Nov. 21, 1986, JP-A-61 150206 (Toshiba Corp.), Jul. 8, 1986, abridged.

*Primary Examiner*—Michael L. Gellner
*Assistant Examiner*—Anh Mai
*Attorney, Agent, or Firm*—Oblon, Spivak, McClelland, Maier & Neustadt, P.C.

[57] ABSTRACT

A magnetic core includes a body made of polycrystalline ceramic and at least one localized gap made of a composite magnetic material. The gap may be preferably fixedly joined to the body by bonding or molding. The magnetic core has applications in inductors or transformers. The inductor preferably has a coil located on the body, which coil is preferably made of multistranded enameled wires.

12 Claims, 2 Drawing Sheets

COMBINED MAGNETIC CORE

BACKGROUND OF THE INVENTION

1. Field of the Invention

The present invention relates to a combined magnetic core especially for inductors or transformers.

The inductors thus made can be used as filtering inductors or as power converters working at frequencies close to or greater than about 0.1 MHz.

In the development of electronic systems, it is sought to miniaturize supply sources. The change from linear-structured regulators to switched-supply converters has been a decisive step towards compactness and the improvement of the performance characteristics of supply sources. The switching frequency has constantly increased with the aim of further miniaturization. Present-day converters attain values of 1 Mhz and even more. The architectures require inductors with low inductance values (some micro-Henries) that must show low total losses (losses of the conductor and of the magnetic circuit) under high induction and use materials with low permeability (below about 200).

2. Description of the Prior Art

The magnetic materials with low permeability that are presently available in the market have very high losses under high induction (greater than about 10 mT). This means that magnetic components are at present the bulkiest components of the converters. For existing magnetic materials, low permeability and low losses are contradictory characteristics. An inductor with an inductance of some micro-Henries will have a few turns or a core with low permeability.

An inductor with a small number of turns, having a high potential difference at its terminals, will give rise to high magnetic induction in the core. Since the losses in the core are at least proportional to the square of the induction, they increase very rapidly when the number of turns decreases. To obtain reduced losses, it is necessary to have a large number of turns. This dictates a core with low permeability.

There are air-based inductors with non-magnetic cores. Their permeability is equal to one and the losses in the core are nil. Their space factor is great because of the permeability equal to one of the non-magnetic core. The copper losses dissipated by the coil are great. The electromagnetic disturbances generated are inconvenient for the neighboring elements and are difficult to eliminate.

There are inductors with magnetic cores made of polycrystalline ceramic, such as spinel type ferrites, with localized air gaps. Despite losses in the range of one hundredth or one-tenth W/cm$^3$, depending on the induction and the frequency, ferrite has permeability values close to 1,000. This is far too high for converter applications. Low-permeability ferrites such as nickel ferrite which has a permeability of 10 have excessive losses for converter applications.

There also exist distributed-gap inductors with composite magnetic cores. These cores are made of material constituted by ferromagnetic powder alloys dispersed in a dielectric binder. Losses by radiation are smaller than those of cores with localized gaps. There are essentially two types of powders: iron powders and iron-carboynl powders whose permeability ranges from 5 to 250 approximately and powders based on iron-nickel alloys whose permeability ranges from 14 to 550 approximately.

The losses in these materials are 15 to 20 times greater than those of massive power ferrites under the same conditions of frequency, induction and temperature.

For example, the best composite magnetic materials available in the market have the following characteristics for toric samples with an average diameter of 10 mm, at ambient temperature, for an induction of 30 mT at 1 MHz:

* iron-carbonyl: losses greater than 1.5 W/cm$^3$
* iron-nickel: losses greater than 2 W/cm$^3$.

The present invention proposes a magnetic core which, at high induction, has losses in the range of those of polycrystalline magnetic ceramics and has permeability reduced by a factor of 100 as compared with the permeability of these materials which generally ranges from 700 to 3,000.

SUMMARY OF THE INVENTION

The present invention relates to a magnetic core comprising a body made of polycrystalline magnetic ceramic with at least one localized gap. The localized gap is made of a composite magnetic material.

Preferably, the polycrystalline magnetic ceramic of the body is a spinel type ferrite corresponding to the formula $M_xZn_yFe_{2+\alpha}O_4$ where M is a manganese or nickel ion and $x+y+\alpha=1$.

The composite magnetic material may be based on ferromagnetic alloys such as iron-carbonyl or iron-nickel powders embedded in a dielectric binder or based on wafers made of polycrystalline magnetic ceramic embedded in a dielectric binder and oriented with their main faces substantially parallel to the magnetic field.

The polycrystalline magnetic ceramic of the wafers is preferably a spinel type ferrite corresponding to the formula: $M'_{x'}Zn_{y'}Fe_{2+\alpha'}O_4$ where M' is a manganese or nickel ion and $x'+y'+\alpha'=1$.

The dielectric binder may be resin of the epoxy, phenol, polyimide or acrylic-based type.

The localized gap may be fixedly joined to the body by bonding or else it may be directly inserted by molding.

A core of this kind can work at induction values greater than those of materials available for one and the same level of losses and one and the same value of permeability.

A core of this kind has a value lower than those available for one and the same level of losses and one and the same level of permeability.

The present invention also relates to an inductor and a transformer comprising a core of this kind.

BRIEF DESCRIPTION OF THE DRAWINGS

Other features and advantages of the invention shall appear from the following description of certain exemplary embodiments, illustrated by the following figures, of which.

DETAILED DESCRIPTION OF THE PREFERRED EMBODIMENTS

Figure 1:
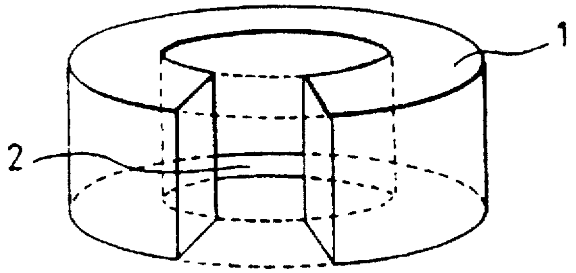
FIG. 1 shows a toric core according to the invention.

FIG. 1 gives a schematic view of a toric core according to the invention. This core has a body 1 made of polycrystalline magnetic ceramic with at least one localized gap 2. The gap 2 is made of a composite magnetic material.

The fact of inserting a localized gap 2 into the magnetic circuit formed by the body made of polycrystalline magnetic ceramic reduces the permeability of the body almost without increasing its losses. The polycrystalline magnetic ceramic is a spinel type ferrite corresponding to the formula $M_xZn_yFe_{2+\alpha}O_4$ where M is a manganese or nickel ion and $x+y+\alpha=1$.

The body 1 may be a power ferrite of the PC50 type from TDK, F4 type from LCC, or 3F4 type from Philips. Its permeability is equal to about 1,000 at 1 MHz.

The gap 2 may be a composite material based on ferromagnetic power alloys such as iron-carbonyl or iron-nickel powders dispersed in a dielectric binder. In the case of iron-carbonyl powder, the grains will preferably be chemically passivated to prevent their oxidation.

The binder may be a resin of the epoxy, phenol, polyimide or acrylic-based type.

The gap may be a composite material of the A08 type from Saphyr, T26 type from Micrometal, or series 55,000 or 58,000 type from Magnetics. Its permeability is of the order of 10 to 1 MHz.

In FIG. 1, the width e of the gap 2 is equal to about a quarter of the perimeter of the core. In the existing cores, with air gaps, the width of the gap may be very small as compared with that of the body to avoid leakages by radiation which are particularly disturbing for components placed in the vicinity of the core. In the core according to the invention, the gap 2 made of composite material canalizes the flux, and leakages by radiation are practically eliminated.

The apparent permeability μa of a core such as the one shown in FIG. 1 is given in a first estimate by:

$$\mu a = \frac{\mu 1 \cdot \mu 2}{\mu 2 + \epsilon \cdot \mu 1}$$

$$\text{here } \epsilon = \frac{e}{Lm}$$

e: width of the gap

Lm: equivalent magnetic length of the core

μ1: permeability of the ferrite body

μ1≈ 1,000 for an MnZn ferrite

μ2:≈ permeability of the gap made of composite magnetic material

μ2≈ 10 for an iron-carbonyl composite.

The permeability pa is therefore equal to about 34. This is quite acceptable for an application in converters with a high level of integration.

Figure 2:
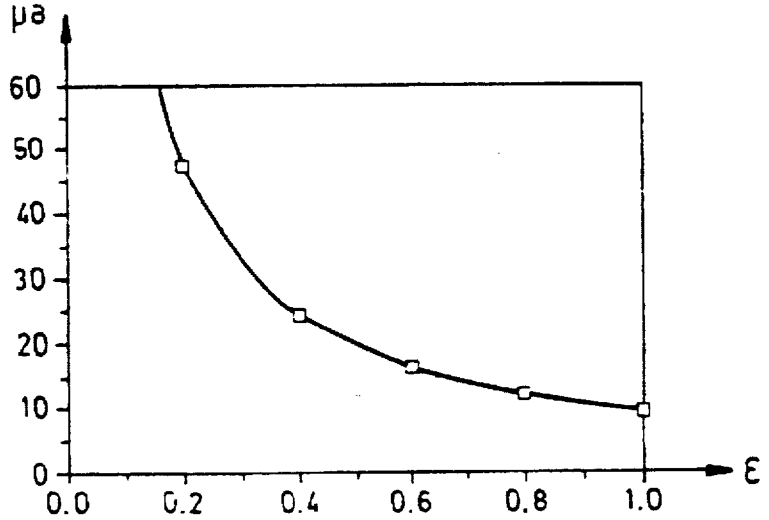
FIG. 2 shows the variation of the apparent permeability of a combined ferrite/iron-carbonyl toric core according to the invention as a function of $\epsilon$; $\epsilon$ being the ratio of the width of the gap to the equivalent magnetic length of the core.

FIG. 2 gives the variation of the apparent permeability of a ferrite/iron-carbonyl toric core according to the invention as a function of ε.

The permeability of a core of this kind was considerably reduced following the insertion of a gap whose width amounted to 20% of the equivalent magnetic length of the core.

Figure 3:
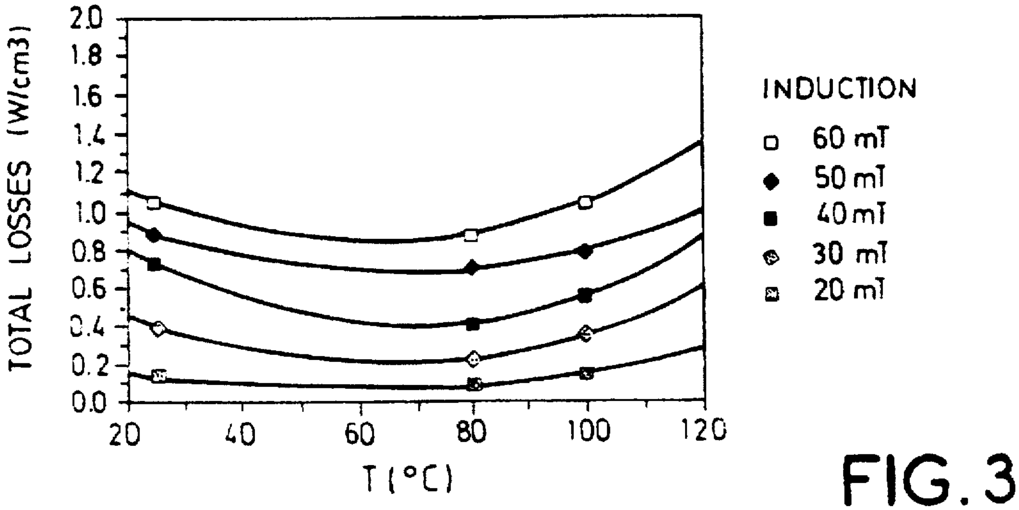
FIG. 3 shows the total losses as a function of the induction and of the temperature of a combined ferrite/iron-carbonyl toric core according to the invention.

Measurements of total losses of a ferrite/iron-carbonyl toric core such as that of FIG. 1 are given in FIG. 3 as a function of the induction and the temperature. Very low losses are observed over a wide range of temperature. These losses are compatible with most of the converter applications. The total losses of a ferrite/iron-carbonyl toric core according to the invention at 80° C. and 30 mT are equal to 0.22 W/cm$^3$.

The total losses measured under the same conditions for the composite material made of massive iron-carbonyl are equal to 2.5 W/cm$^3$. The gain is greater than 10. The fact of introducing a localized gap 2 made of composite magnetic material having high losses caused practically no deterioration of the losses of the core as compared with those of the spinel type ferrite body.

The gap 2 can also be made of a composite magnetic material such as the one described in the French patent application filed on 19th Sep. 1995 under No. 95 10952 by the present Applicant.

This composite magnetic material has wafers made of polycrystalline magnetic ceramic embedded in a dielectric binder. The wafers are oriented so that their main faces are substantially parallel to the magnetic field to which the core is designed to be subjected. The polycrystalline magnetic ceramic is a spinel type ferrite corresponding to the formula: $M'_xZn_yFe_{2+\alpha}O_4$ with x'+y'+α' where M is a manganese or nickel ion.

The binder is a resin, for example of the epoxy, phenol, polyimide or acrylic-based type.

The wafers are stacked in strata and embedded in the binder. There may be one or more wafers per stratum. From one stratum to another, the wafers may be arranged in columns or may be staggered.

The gap 2 may be fixedly joined to the body 1 by bonding for example. It may also be directly molded in its position.

Figure 4:
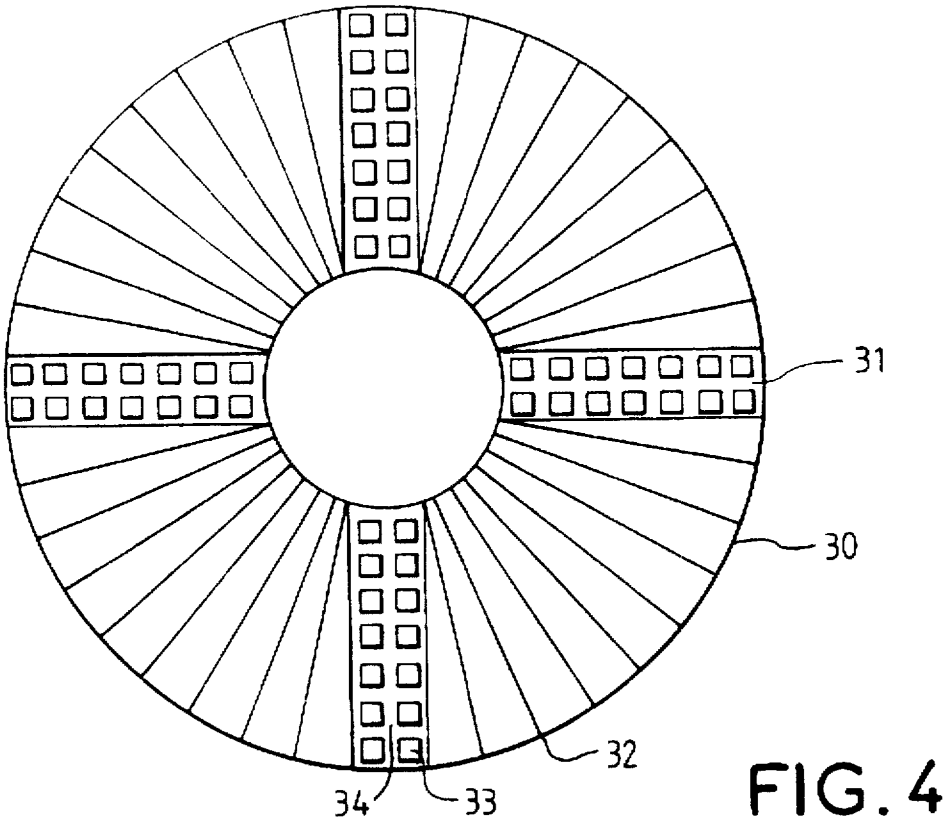
FIG. 4 shows an inductor according to the invention.

The present invention also relates to an inductor made from a core of this kind. FIG. 4 shows an exemplary inductor made from a toric core with a ferrite body 30 and four localized gaps 31 arranged in a regular pattern in the body 30. These gaps 31 are made with wafers 33 embedded in a dielectric binder 34 as described here above. The wafers 33 have a main face 33(*a*), which main face is oriented substantially parallel to the magnetic field. This inductor also has a coil 32 preferably located on the body 30 so as to minimize the interaction of the coil 32 with the gaps 31 made of composite magnetic material having lower permeability than that of the body 30. The conductors used for the coil 32 are preferably multistranded enamelled wires or Litzendraht wires so as to reduce the copper losses at frequencies greater than about 50 kHz. These inductors may be used as filtering inductors or resonant converter inductors.

The making an inductor according to the invention begins with the choosing of the material of the body of the core as a function of the frequency at which the inductor must work and as a function of the apparent permeability that it should have. Then, on the basis of the permeability possessed by this material, the dimensions of the gap or gaps and their charging with magnetic material are computed to obtain the desired apparent permeability.

Figure 5:
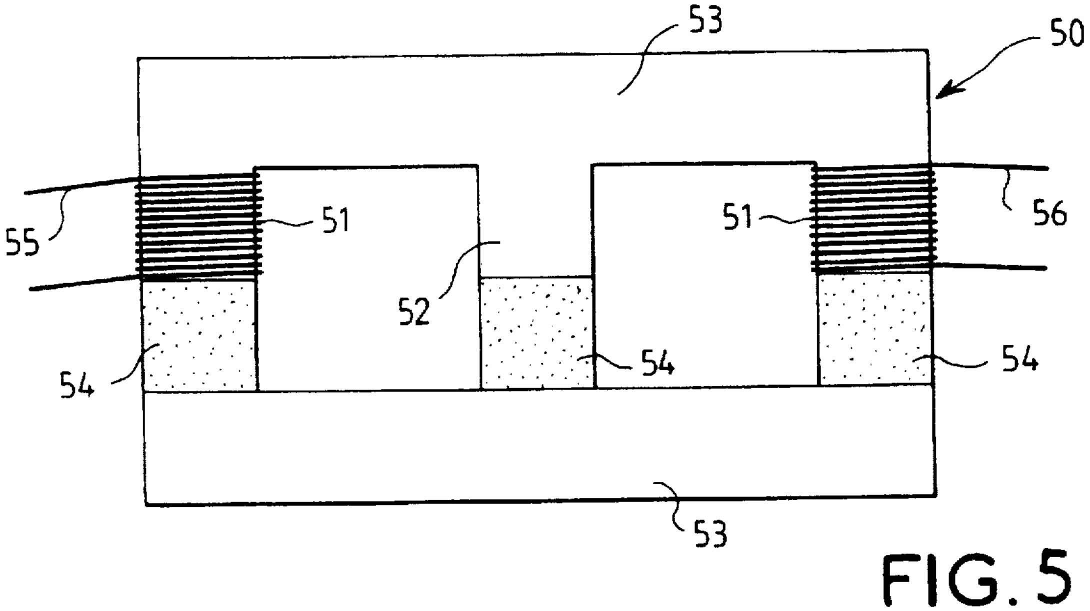
FIG. 5 shows a transformer according to the invention

FIG. 5 shows a transformer according to the invention. It has an E-shaped core 50 with rectangular legs, including one central leg 52 and two end legs 51. This core 50 has a body 53 made of ferrite and at each leg 51, 52 it has a localized gap 54 made of composite magnetic material.

Two coils 55, 56 around the end legs 51 contribute to forming the primary and secondary windings of the transformer. These windings do not surround the gaps 54.

In the examples described, the gaps all had the same shape. It is clear that they could have different shapes, different types of composition and different values of charging with magnetic material.

What is claimed is:

1. A magnetic core comprising a body made of polycrystalline magnetic ceramic and at least one localized gap made of a composite magnetic material, wherein the composite magnetic material is made of wafers having main faces and polycrystalline magnetic ceramic embedded in a dielectric binder and oriented with their main faces substantially parallel to the magnetic field.

2. A core according to claim 1, wherein the polycrystalline magnetic ceramic of the body is a spinel type ferrite corresponding to the formula:

$M_xZn_yFe_{2+\alpha}O_4$ where M is a manganese or nickel ion and $x+y+\alpha=1$.

3. A core according to claim 1, wherein the polycrystalline magnetic ceramic of the wafers is a spinel type ferrite corresponding to the formula:

$M'_xZn_{y'}Fe_{2+\alpha'}O_4$ where M is a manganese or nickel ion and $x'+y'+\alpha'=1$.

4. A core according to claim 1, wherein the dielectric binder is a resin of the epoxy, phenol, polyimide or acrylic-based type.

5. A core according to claim 1, wherein the localized gap is fixedly joined to the body by bonding.

6. A core according to claim 1, wherein the localized gap is fixedly joined to the body by molding.

7. An inductor comprising a core according to any of the claims 1 to 6.

8. An inductor according to claim 7, comprising at least one coil located on the body of the core.

9. An inductor according to claim 7, wherein the coil is made with multistranded conductors.

10. A transformer comprising a core according to one of the claims 1 to 6.

11. A transformer according to claim 10, comprising at least one coil located on the body of the core.

12. A transformer according to claim 10, wherein the coil is made with multistranded conductors.

* * * * *